April 29, 1941.  W. G. HARVEY  2,240,001
STERILIZER
Filed Dec. 22, 1937   2 Sheets-Sheet 1
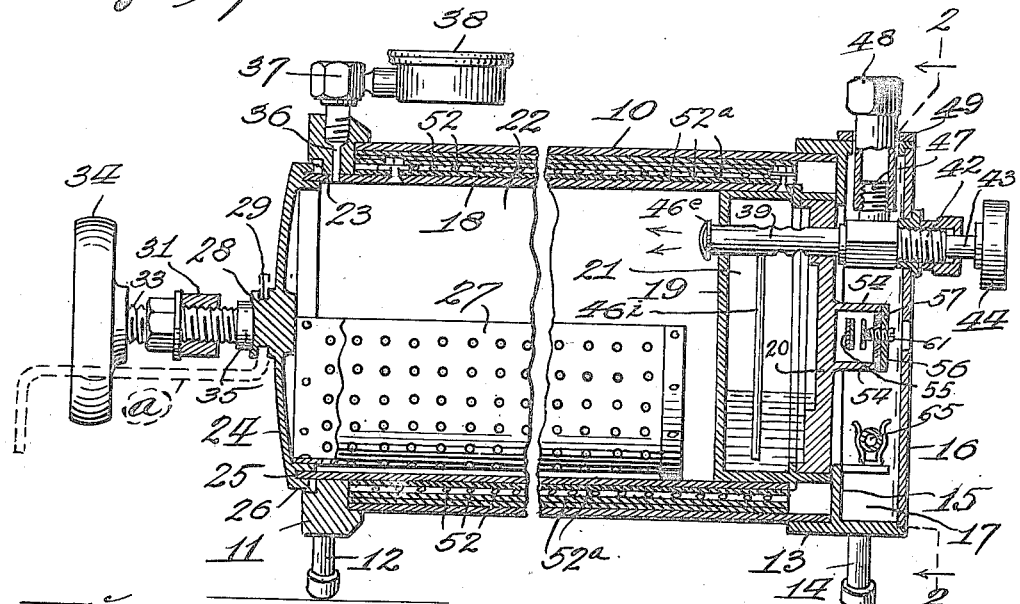
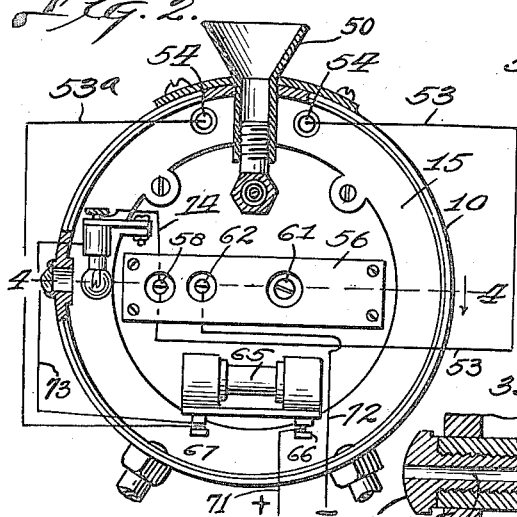
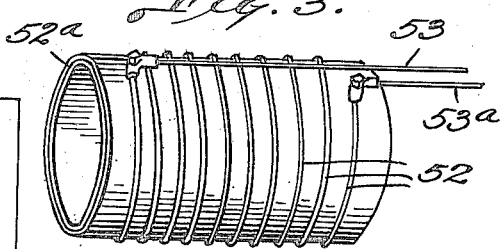
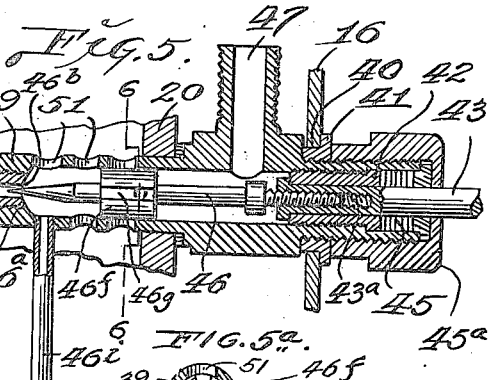
INVENTOR.
WALTER G. HARVEY.
BY Martin P. Smith
ATTORNEY.

April 29, 1941.    W. G. HARVEY    2,240,001
STERILIZER
Filed Dec. 22, 1937    2 Sheets-Sheet 2
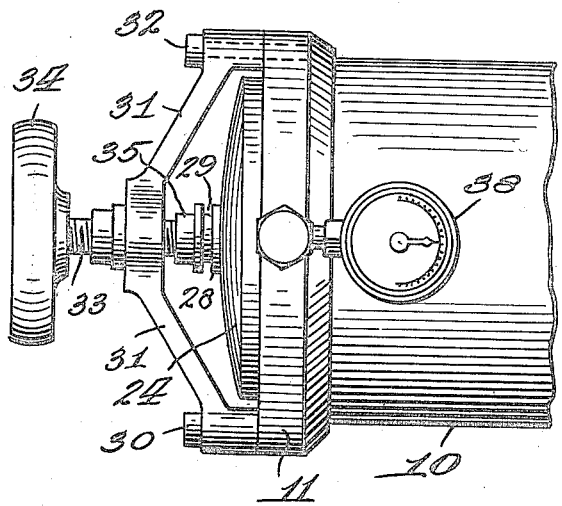
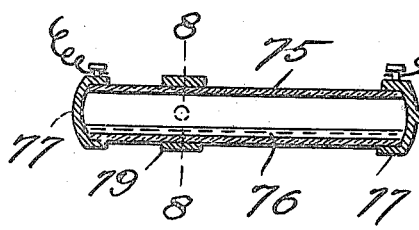
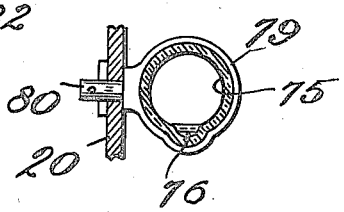
INVENTOR,
WALTER G. HARVEY.
BY Martin C. Smith ATTY.

Patented Apr. 29, 1941

2,240,001

UNITED STATES PATENT OFFICE 2,240,001

STERILIZER

Walter G. Harvey, Los Angeles, Calif.; Elizabeth S. Harvey administratrix of said Walter G. Harvey, deceased Application December 22, 1937, Serial No. 181,183

1 Claim. (Cl. 21—110)

My invention relates to a sterilizer, and has for its principal object the provision of a relatively simple, practical and inexpensive device that may be conveniently employed for the comparatively rapid and effective sterilization of various articles, and particularly tools and equipment utilized by dentists, surgeons, barbers, dermatologists and the like.

A further object of my invention is, to provide a device of the character referred to, wherein the sterilization is accomplished by means of heat and vapor produced from a liquid or combination of liquids capable of killing microorganisms, such as bacteria disease germs and the like.

Further objects of my invention are, to provide a sterilizer wherein the heat required to effect sterilization and vaporization of the liquid within the device is produced by the passage of an electric current through a heating coil, the flow of which electric current is controlled by a thermostat, and the action of the latter being controlled by the heat developed within the sterilizer, so as to minimize the possibility of leakage of internal pressures developed during the sterilizing process, and further, to provide simple means for conveniently delivering sterilizing liquid to a chamber within the housing of the sterilizer.

A further object of my invention is, to provide a sterilizer of the character referred to, having a readily removable head or end plate that is associated with it, means for clamping the head or plate to the end of the sterilizer housing and said head or end plate carrying a tray that receives and holds the instruments or articles while the same are being sterilized.

A further object of my invention is, to provide a sterilizer having means for delivering both sterilizing fluid and its vapor into the sterilizing chamber.

With the foregoing and other objects in view, my invention consists in certain novel features of construction and arrangements of parts that will be hereinafter more fully described and claimed and illustrated in the accompanying drawings in which:

Fig. 1 is a vertical section taken lengthwise through the center of a sterilizer constructed in accordance with my invention.

Fig. 2 is a vertical section taken approximately on the line 2—2 of Fig. 1, with parts shown in elevation.

Fig. 3 is a perspective view of the heating coil used in the sterilizer.

Fig. 4 is an enlarged horizontal section taken on the line 4—4 of Fig. 2.

Fig. 5 is an enlarged section taken through the center of the needle valve that controls the flow of vapor into the sterilizing chamber.

Fig. 5a is a cross section taken on the line 6—6 of Fig. 5.

Fig. 6 is a top plan view of the end portion of the sterilizer having the removable head or cover plate.

Fig. 7 is an elevational view of the modified form of the thermostat and switch that controls the flow of electric current to the heating coil.

Fig. 8 is a cross section taken on the line 8—8 of Fig. 7.

Referring by numerals to the accompanying drawings which illustrate an embodiment of my improved sterilizer, 10 designates the outer shell or wall of the sterilizer body, which shell is preferably formed of metal tubing, and suitably secured to one end thereof, is a metal ring 11, from the lower portion of which depends short legs 12.

Suitably secured to the other end of the shell 10 is a ring 13, from which depends short legs 14, and which latter, together with the legs 12, provide support for the sterilizer to hold the same in a horizontal position.

Projecting inwardly from the intermediate portion of ring 13 is a flange 15, and the outer end of the ring is closed by a readily removable plate 16.

The space 17 between the flange 15 and plate 16 provides a chamber for several parts of the sterilizer, including the thermostatically operated switch that controls the flow of electric current to the heating coil, the fuse located in the electric circuit and other essential parts hereinafter described in detail.

An inner shell 18, preferably a metal tubing slightly smaller in diameter than the shell 10, is positioned concentrically within the outer shell 10, with one end passing through and rigidly fixed to ring 11. Rigidly fixed to the opposite end of the inner shell 18 is a short cylindrical housing 19, the outer end of which bears against flange 15, and secured within the outer portion of this housing by welding or otherwise, is a disc-shaped head 20.

The chamber 21, within the housing, is adapted to receive the liquid or combination of liquids that are vaporized to produce the germicide that is admitted to the sterilizing chamber 22 within the inner shell 18. The end of the inner shell 18 projects a short distance beyond the outer face of ring 11, and formed in said ring and surrounding said projecting end is a groove that contains a packing ring 23.

The edge of a disc-shaped head 24 is provided with a groove 25 for the reception of the projecting end of shell 18, and a flange 26 on the head that surrounds said groove is adapted to engage the packing ring 23, thus providing a fluid pressure tight joint between the head 24 and the end of the inner shell 18.

Suitably secured to the inner end of the head 24 is a substantially channel-shaped tray 27 that is adapted to receive and hold the tools, instruments and other objects that are to be sterilized, and this tray projects into the lower portion of chamber 22 and terminates adjacent the inner wall of the housing 19. Tray 27 is preferably formed of perforated or reticulated material, in order that the heated sterilizing vapor may circulate freely through said tray.

Formed on the outer face of the central portion of the head is a boss 28 in which is formed a groove 29, which groove is adapted to receive the notched end of a handle that is used in removing the head from the end of the sterilizer, which tool is shown by dotted lines a, Fig. 1.

Mounted for swinging movement on a pin 30, that is seated in ring 11 to the side of the body of the sterilizer, is a horizontally disposed yoke 31, the free end of which is notched for engaging a headed pin 32 that is seated in ring 11, diametrically opposite from pin 30. This arrangement permits the yoke to be swung upwardly and thence outwardly, to permit the head 24 to be applied to or removed from the end of the inner tube 18 and ring 11.

To firmly clamp the head 24 against ring 11 and the end of inner tube 18, a screw 33, provided on its outer end with a handle 34, passes through the center of yoke 31, and the end of said screw carries a head 35 that is adapted to engage against the outer face of the boss 28. By rotating the screw so as to move same inwardly through the yoke, the head 35 engages boss 28 and presses the marginal portion of the head 24 against the end of tube 18 and the packing ring 23, thereby producing a fluid pressure-tight joint and preventing the escape of the sterilizing vapor from chamber 22.

Formed through the upper portion of ring 11 and through the wall of tube 18 is a duct 36, to which is connected a tubular fitting 37 that carries a conventional pressure gauge 38, and which latter occupies a position directly above the sterilizer as illustrated in Fig. 1.

The inner portion of a tubular valve housing 39 projects through head 20 and the inner wall of housing 19, the outer portion of which valve housing extends through end plate 16 and is secured thereto by means of a bushing 41 that is screw-seated on the threaded outer portion of said valve housing, and which bushing occupies an aperture 40 in said plate 16.

Screw-seated within the outer portion of valve housing 39 is a bushing 42 through which passes a valve operating rod or stem 43 carrying on its outer end a handle 44. A packing gland 45 is positioned within the outer portion of valve housing 39, against the outer end of bushing 42, and which gland is held in position by nut 45a that is screw-seated on the threaded outer portion of the valve housing and which nut serves as a locknut for the bushing 41.

Formed in the inner end of stem or rod 43 is a threaded bore 43a that receives the left hand threaded rear portion of a needle valve 46 having a pointed forward end 46a that is adapted to engage a seat 46b that is formed at the inner end of an axial bore 46d, which latter is formed through a stem 46e that is screw-seated in the inner end of the valve-housing 39.

Needle valve 46 carries within the chamber in the valve-housing 39 a short cylindrical block 46f, in which is formed a plurality of longitudinally disposed grooves 46g.

Seated in the wall of the valve-housing 39 is a pin 46h, the inner end of which enters one of the grooves in the cylinder 46f thus holding the needle valve 46 against rotary movement, but at the same time permitting it to move lengthwise within the valve-housing.

Seated in the lower portion of the valve-housing immediately to the rear of the valve seat 46b, is the upper end of a small tube 46i that extends downwardly to a point near the bottom of the sterilizing fluid chamber 21.

Formed integral with and projecting upwardly from the valve-housing within chamber 17 is an externally threaded nipple 47 that communicates with the chamber within the valve-housing, and screw-seated on said nipple is the lower end of a cap 48 which closes said nipple and prevents the escape of fluid pressure therethrough. Cap 48 projects through an opening 49, formed in the top portion of ring 13.

In order to fill or partially fill chamber 21 with a germicidal liquid, a funnel 50, having the lower portion of its spout internally threaded, is adapted to be removably positioned on the nipple 47, as illustrated in Fig. 2; and to permit the liquid to flow freely through the valve-housing into the chamber 21 and to permit air to pass from said chamber outwardly through valve-housing and nipple, a series of apertures such as 51 are formed through the upper and lower portions of the wall of the valve-housing within the chamber 21 and to the rear of the seat 46b that receives the tapered end of the valve. (See Fig. 5.)

The means for heating the interior of the sterilizer including the liquid-containing chamber 21, consists of a coil of wire 52 that is embedded in layers of insulation 52a, preferably asbestos, that fill the space between the tubes 10 and 18. The ends of this coil, as illustrated in Fig. 3, are connected to conductors 53 and 53a that pass through plugs of insulation 54 that are seated in flange 15.

Formed integral with and projecting outwardly from the central portion of the outer face of head 20 are four walls 54 that provide a chamber 55 for the reception of the thermostat that controls the current flow to heating coil 52, and removably secured to said walls 54 is a cover plate 56.

Secured to the inner face of cover plate 56 is a sheet 57 of insulation, and secured to one end thereof by a binding post 58 is one end of a flat strip of resilient metal 59, the free end of which carries a contact 60. The tendency of the free end of this resilient metal strap is to flex toward the sheet of insulation 57, and to adjust the free end of said strap away from the insulation, a screw 61 passes through cover plate 56 and the inner end of said screw carries a small block 61a of insulating material that makes contact with the intermediate portion of the spring 59.

A binding post 62 passes through and is insulated from cover plate 56 and spring 59, and secured to the inner end of this binding post is a conventional thermostatic element 63, preferably composed of two strips of metal having different co-efficients of expansion that are especially arranged so that rising temperature tends to move the free end of said thermostat away from the free end of spring 59.

Carried by the free end of thermostatic member 63 is a contact 64 that is adapted to engage contact 60 on spring 59, thereby closing an electric circuit through the thermostatic element and said spring.

Suitably supported within chamber 17 preferably below the housing formed by the walls 54, is a conventional electric fuse 65 having binding posts 66 and 67.

Located in the side of ring 13 is a small window 68, preferably of the type having a faceted transparent member 69, and suitably supported within the chamber 17 immediately adjacent this window, is a small electric lamp 70.

One conductor 71 of an electric current supply line is connected to binding post 66 that is connected to one end of the fuse 65, and the other conductor 72 of the supply line is connected to binding post 62. One of the conductors 53 from heating coil 52 is connected to binding post 58, and the other one of the conductors leading from the heating coil, and which is designated by the numeral 53a in Fig. 4, is connected to binding post 67. A conductor 73 extends from binding post 67 to lamp 70 and a conductor 74 extends from the other side of the lamp to binding post 58.

In the use of my improved sterilizer, the instruments, tools or articles to be sterilized are placed in tray 27, and as the head 24 is applied to ring 11 and the end of tube 18, the tray containing the instruments is positioned in the lower portion of chamber 22.

The free end of yoke 31 is now engaged on pin 32, and handle 34 is manipulated to move screw 33 through the yoke and thereby press and clamp the marginal portion of head 24 tightly against the end of tube 18 and against the packing ring 23. Such action produces a fluid pressure-tight joint between head 24 and the body of the sterilizer.

Chamber 21 is filled or partially filled with a germicidal liquid or combination or liquids by applying a funnel 50 to nipple 47, and after this filling operation, funnel 50 is removed and the nipple is closed tightly by screwing cap 48 thereinto. Thus the clamping of the head 24 on the end of the sterilizer, and the application of cap 48 to nipple 47 renders the sterilizer leak-proof.

After closing the duct from the inner end of valve-housing 39 into chamber 21 by proper manipulation of the needle valve 46, the switch in the electric current supply line is closed, with the result that current flows from conductor 71 through fuse 65, thence through conductor 53a through coil 52, thence through conductor 53 to binding post 58 and from thence through spring 59, which, as previously described, is adjusted relative to the thermostat member 63 by adjusting screw 61.

When the apparatus is cold, or before a predetermined degree of heat has been developed, the contact 64 on the end of the element 63 is in engagement with contact 60 carried by spring 59, so that the electric current flowing to spring 59, passes through the contacts 60 and 64, thence through thermostatic element 63 to binding post 62, to which the other side of the current supply line conductor 72 is connected. Obviously, as the current flows through coil 52, the chambers 22 and 21 within the sterilizer will be heated. During this heating period, lamp 70 will be lighted by current flow through conductors 73 and 74, thus giving a visible signal through the window 68 that the apparatus is functioning.

Upon the development of a predetermined degree of temperature within the sterilizer, the solution contained within chamber 21 will start to vaporize, and at the proper time, needle valve 46 is withdrawn from its seat 46b, thereby permitting the vaporized sterilizing solution to discharge into chamber 22 that contains the tray of instruments, tools and other articles to be sterilized.

As the vapor, which is under pressure, passes from chamber 21 into the chamber in which the tray 27 carrying the instruments or articles to be sterilized, a small amount of sterilizing liquid will be drawn upwardly through tube 46i, and such liquid will discharge with the vapor through duct 46d into the sterilizing chamber, thus bringing about thorough sterilization of all instruments and articles contained in tray 27.

The needle valve 46 in its longitudinal movement during the opening and closing of the inner end of duct 46d does not rotate, due to the engagement of pin 46h in one of the grooves 46g. As rod 43 is rotated, the threaded engagement of the rear end of valve stem 46 with the stem 43 will move needle valve 46 longitudinally, to either open or close the duct 46d, and during such movement, the cylindrical block 46f will slide lengthwise within the valve-housing but will not rotate therein.

The ducts 46g in the surface of member 46f enables the sterilizing fluid to flow freely from fitting 47, past cylindrical member 46f to the apertures 51 which communicate with chamber 21.

The combined heat, sterilizing solution and vaporized sterilizing solution cooperate to effect thorough sterilization of all instruments and articles placed in the tray 27, and during the sterilizing period, the thermostatic switch will act automatically to maintain a practically uniform temperature within the sterilizing chamber. If the heat within the chamber rises above a predetermined degree, the thermostatic member 63 will move away from spring 59 so as to open the heating circuit and as the temperature lowers, the thermostatic member will act automatically to restore the circuit.

After the sterilizing period has terminated, needle valve is closed to cut off the further flow of vapor into the sterilizing chamber 22.

To remove the sterilized instruments and articles from the apparatus, it is only necessary to release screw 33 and then disengage the free end of the yoke from pin 32 and the head 24 and tray 27 may now be withdrawn from the sterilizing chamber.

In Figs. 7 and 8 I have illustrated a modified form of the thermostatic switch, and in this construction, a glass tube 75 has formed in its lower portion, a longitudinally disposed channel 76 adapted to contain mercury, and secured to the ends of said tube are metal caps 77, the latter being electrically connected to the heating coil that surrounds the sterilizing chamber.

Projecting from one of the caps 77 is a finger 78, and surrounding tube 75 is a collar 79 that is located a substantial distance to one side of the longitudinal center of the tube, and projecting from the rear side of this collar is a pin 80 that is journalled in the head 20. Thus the end of the tube having the cap 77 that carries finger 78 tends to move downward by gravity. One end of a coiled bi-metal thermostat 81 is normally positioned beneath finger 78, and the opposite end of this thermostat is secured to a screw 82 that is seated in head 20. By rotating screw 82, the end of the thermostat 81 that is positioned beneath the finger 78 may be raised or lowered; consequently, controlling the operation of the switch. Under normal conditions, or while the coil 52 is being heated, tube 75 occupies a substantially horizontally position so that the caps 77 on the ends thereof are electrically connected by the body of mercury within the channel 76.

When the heat rises above the predetermined degree, thermostat 81 will expand, thus raising the end of the tube having the cap that carries the finger 78 and as the tube leaves its horizontal position, the mercury will flow to one end of the tube so as to break the electrical connection between the caps 77. As the temperature lowers, thermostat 81 will contract, thus permitting the tube 75 to swing back to a horizontal position which permits the mercury to restore the electrical connection between the caps 77.

Thus it will be seen that I have provided a sterilizing apparatus that is relatively simple in construction, inexpensive of manufacture, entirely automatic in controlling the degree of heat developed to bring about effective sterilization of various articles, such as instruments and equipment used by dentists, surgeons, barbers and the like, and said apparatus being very effective in performing the functions for which it is intended.

It will be understood that minor changes in the size, form and construction of the various parts of my improved sterilizer may be made and substituted for those herein shown and described without departing from the spirit of my invention, the scope of which is set forth in the appended claim.

I claim as my invention:

In a sterilizing apparatus, a housing having a sterilizing chamber and a separate chamber adapted to receive a sterilizing solution, electrical heating means arranged within said housing and surrounding both of the chambers therein for heating said chambers, valvular means for controlling the discharge of vaporized sterilizing solution from the solution-containing chamber into the sterilizing chamber and means whereby sterilizing solution is drawn from the solution chamber and delivered with the vaporized solution into the sterilizing chamber.

WALTER G. HARVEY.